(No Model.)
W. S. BROWN.
SLIDING GATE.
No. 349,920. Patented Sept. 28, 1886.
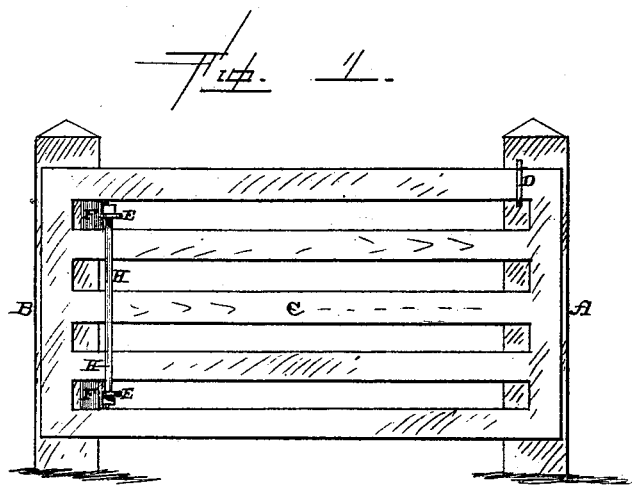
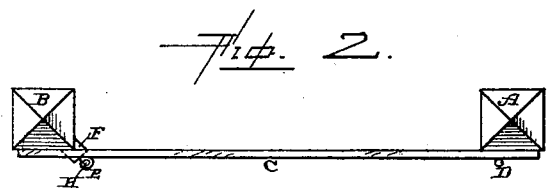
Witnesses
R. F. Gardner
A. S. Pattison
Inventor
W. S. Brown,
per
F. A. Lehmann,
Atty.

UNITED STATES PATENT OFFICE.

WILLIAM STEWART BROWN, OF BAYNEVILLE, KANSAS.

SLIDING GATE.

SPECIFICATION forming part of Letters Patent No. 349,920, dated September 28, 1886.

Application filed May 6, 1886. Serial No. 201,313. (No model.)

*To all whom it may concern:*

Be it known that I, WILLIAM STEWART BROWN, of Bayneville, in the county of Sedgwick and State of Kansas, have invented certain new and useful Improvements in Sliding Gates; and I do hereby declare the following to be a full, clear, and exact description of the invention, such as will enable others skilled in the art to which it pertains to make and use it, reference being had to the accompanying drawings, which form part of this specification.

My invention relates to an improvement in sliding gates; and it consists in the combination of the fence-posts, the bolts which support the gate, the iron blocks which are placed upon the bolts, and the vertical rod which prevents the gate from coming off the bolts, as will be more fully described hereinafter.

The object of my invention is to provide suitable supports for the sliding gate, which will receive all of the wear of the gate in being moved back and forth, and to hold the gate upon the supports by means of a vertical rod, which can be readily removed at any time to allow the gate to be raised upward so as to either pass over snow-drifts, or to allow small stock to pass under.

Figure 1 is a side elevation of a gate embodying my invention. Fig. 2 is a plan view of the same.

A B represent the two gate-posts, and C the sliding gate. To the post A is secured a hook, D, which supports the free end of the gate when it is closed, and to the post B are secured two or more eyebolts, E. The gate might rest directly upon these eyebolts as it moves back and forth; but in order to prevent the bolts from being worn by the gate as it moves back and forth iron blocks F are placed upon the bolts, and these blocks form the supports upon which the edges of the bars of the gate bear as the gate is being moved back and forth. In order to prevent the gate from becoming displaced from the bolts and blocks, there is passed vertically downward through the eyes of the bolts a rod, H, which serves to prevent the gate from moving outward.

It will be seen that the gate is supported in position by means of bolts which pass through the bearing-blocks, and that a simple rod is used to prevent the gate from becoming displaced. This construction is very cheap and simple, and the parts cannot get out of order. When it is desired to raise the gate upward, so as to pass over snow-drifts, or to allow small animals to pass through, the vertical rod is removed, so as to allow the gate to be taken off, and it is then raised up one or more bars, and thus its lower edge is kept a suitable distance above the surface of the ground.

I am aware that it is not new to place supports upon the post which supports the gate, and to move the gate back and forth upon the supports which project through the gate, and that it is not new to prevent the gate from becoming displaced from the supports by means of a post or upright, which is placed by the side of the post upon which the gate moves, and these I disclaim.

Having thus described my invention, I claim—

The combination of the posts A B, the sliding gate C, the eyebolts E, the friction-blocks F, which are placed upon the bolts, and the vertical rod which is passed down through the bolts upon the outer side of the gate, substantially as described.

In testimony whereof I affix my signature in presence of two witnesses.

WILLIAM STEWART BROWN.

Witnesses:
B. F. TAYLOR,
F. BEBEE.